United States Patent
Causey et al.

(10) Patent No.: US 9,122,393 B2
(45) Date of Patent: Sep. 1, 2015

(54) PREDICTIVE SENSITIZED KEYPAD

(75) Inventors: Mark Edward Causey, Tucker, GA (US); Jeffrey Norbert Howard, Suwanee, GA (US); Andrew Thomas Smoak, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 480 days.

(21) Appl. No.: 12/571,117

(22) Filed: Sep. 30, 2009

(65) Prior Publication Data

US 2011/0074704 A1    Mar. 31, 2011

(51) Int. Cl.
*G06F 3/041* (2006.01)
*G06F 3/0488* (2013.01)
*G06F 3/023* (2006.01)

(52) U.S. Cl.
CPC .......... *G06F 3/04886* (2013.01); *G06F 3/0237* (2013.01)

(58) Field of Classification Search
CPC ............ G06F 3/04886; G06F 3/04883; G06F 3/04895
USPC .................... 345/168, 169, 173; 715/773, 816
See application file for complete search history.

(56) References Cited

U.S. PATENT DOCUMENTS

| | | | |
|---|---|---|---|
| 5,128,672 A | 7/1992 | Kaehler | |
| 5,483,235 A | 1/1996 | Hanson et al. | |
| 5,574,482 A | 11/1996 | Niemeier | |
| 5,963,671 A | 10/1999 | Comerford et al. | |
| 6,307,541 B1 | 10/2001 | Ho et al. | |
| 6,573,844 B1 | 6/2003 | Venolia et al. | |
| 6,614,422 B1 | 9/2003 | Rafii | |
| 6,724,370 B2 | 4/2004 | Dutta et al. | |
| 7,215,327 B2 | 5/2007 | Liu et al. | |
| 7,376,938 B1 | 5/2008 | Van der Hoeven | |
| 7,583,206 B2 | 9/2009 | Volckers | |
| 2002/0035486 A1* | 3/2002 | Huyn et al. ........................ 705/3 |
| 2002/0152203 A1 | 10/2002 | Ostergaard et al. | |
| 2002/0171633 A1 | 11/2002 | Brinjes | |

(Continued)

FOREIGN PATENT DOCUMENTS

JP   2000330946   11/2000

OTHER PUBLICATIONS

LetterWise, Jun. 21, 2005, pp. 1-2.*

(Continued)

*Primary Examiner* — Latanya Bibbins
(74) *Attorney, Agent, or Firm* — Hartman & Citrin LLC

(57) ABSTRACT

Devices and methods are disclosed which relate to improving the efficiency of text input by generating a dynamic virtual keyboard. Disclosed examples display a soft keyboard on a touchscreen of a text-entry device. The touchscreen works with the soft keyboard as a form of text input. Keyboard logic on the text-entry device is programmed to change the sensitivity of the footprint of keys surrounding a predicted key or keys, based upon the prior entry. The keyboard logic assigns a prediction value to each key based on a statistical probability that the key will be entered next. The touchscreen displays a dynamic virtual keyboard based on these prediction values. Enhancements include reducing the sensitivity of the footprint of keys relative to their prediction value. For instance, if a key is very unlikely to be the next intended key pressed, the footprint of the key will only respond to a key press of greater force than a key which is likely to be entered next.

10 Claims, 7 Drawing Sheets

(56) References Cited

U.S. PATENT DOCUMENTS

| | | |
|---|---|---|
| 2003/0095102 A1 | 5/2003 | Kraft |
| 2004/0018857 A1 | 1/2004 | Asokan et al. |
| 2004/0095327 A1 | 5/2004 | Lo |
| 2004/0215726 A1 | 10/2004 | Arning et al. |
| 2005/0071778 A1 | 3/2005 | Tokkonen |
| 2005/0167251 A1 | 8/2005 | Sugimura et al. |
| 2005/0188330 A1* | 8/2005 | Griffin ............ 715/816 |
| 2005/0225540 A1* | 10/2005 | Kawakami et al. ...... 345/173 |
| 2005/0253816 A1 | 11/2005 | Himberg et al. |
| 2006/0009891 A1 | 1/2006 | Pawlak et al. |
| 2006/0132446 A1 | 6/2006 | Soh et al. |
| 2006/0168539 A1 | 7/2006 | Hawkins et al. |
| 2006/0256139 A1 | 11/2006 | Gikandi |
| 2006/0279434 A1 | 12/2006 | Wang |
| 2007/0016572 A1 | 1/2007 | Bates et al. |
| 2007/0046641 A1 | 3/2007 | Lim |
| 2007/0229476 A1 | 10/2007 | Huh |
| 2007/0288578 A1 | 12/2007 | Pantalone |
| 2008/0174570 A1 | 7/2008 | Jobs et al. |
| 2008/0281583 A1 | 11/2008 | Slothouber |
| 2008/0309621 A1 | 12/2008 | Aggarwal et al. |
| 2009/0040184 A9 | 2/2009 | Pu et al. |
| 2009/0051661 A1 | 2/2009 | Kraft et al. |
| 2009/0062623 A1* | 3/2009 | Cohen et al. ............. 600/300 |
| 2009/0106695 A1* | 4/2009 | Perry et al. ............. 715/816 |
| 2009/0150322 A1 | 6/2009 | Bower et al. |
| 2009/0174667 A1* | 7/2009 | Kocienda et al. ........ 345/169 |
| 2009/0189864 A1 | 7/2009 | Walker |
| 2009/0195506 A1 | 8/2009 | Geidl |
| 2009/0289958 A1 | 11/2009 | Kim et al. |
| 2009/0319694 A1 | 12/2009 | Slezak et al. |
| 2010/0026650 A1* | 2/2010 | Srivastava et al. ........ 345/173 |
| 2010/0036833 A1 | 2/2010 | Yeung et al. |
| 2010/0085313 A1 | 4/2010 | Rider |
| 2010/0085317 A1 | 4/2010 | Park et al. |
| 2010/0203874 A1 | 8/2010 | Scott et al. |
| 2010/0259561 A1 | 10/2010 | Foruntanpour |
| 2010/0265181 A1 | 10/2010 | Shore |
| 2011/0029862 A1 | 2/2011 | Scott et al. |
| 2012/0050169 A1 | 3/2012 | Ladouceur et al. |
| 2012/0244914 A1 | 9/2012 | Lundy et al. |

OTHER PUBLICATIONS

Hoggan et al., "Investigating the Effectiveness of Tactile Feedback for Mobile Touchscreens," Proc. of the SIGCHI Conf. on Human Factors in Computing Systems, pp. 1573-1582 (Apr. 2008).*
Hoffmann et al., "TypeRight: A Keyboard with Tactile Error Prevention," Proc. of the SIGCHI Conf. on Human Factors in Computing Systems, pp. 2265-2268 (Apr. 2009).*
U.S. Office Action dated Oct. 3, 2011 in U.S. Appl. No. 12/570,096.
U.S. Office Action dated Mar. 8, 2012 in U.S. Appl. No. 12/570,096.
U.S. Office Action dated Apr. 24, 2013 in U.S. Appl. No. 12/570,096.
U.S. Office Action dated Nov. 28, 2011 in U.S. Appl. No. 12/571,053.
U.S. Office Action dated Jul. 9, 2012 in U.S. Appl. No. 12/571,053.
U.S. Office Action dated Nov. 21, 2012 in U.S. Appl. No. 12/571,053.
U.S. Office Action dated May 24, 2013 in U.S. Appl. No. 12/571,053.
U.S. Office Action dated Sep. 23, 2013 in U.S. Appl. No. 12/570,096.
U.S. Office Action dated Sep. 25, 2013 in U.S. Appl. No. 12/571,053.
U.S. Office Action dated Dec. 23, 2011 in U.S. Appl. No. 12/571,157.
U.S. Office Action dated Aug. 16, 2012 in U.S. Appl. No. 12/571,157.
U.S. Office Action dated Mar. 14, 2013 in U.S. Appl. No. 12/571,157.
U.S. Office Action dated Dec. 22, 2011 in U.S. Appl. No. 12/571,192.
U.S. Office Action dated Nov. 20, 2012 in U.S. Appl. No. 12/571,192.
U.S. Office Action dated Jun. 19, 2013 in U.S. Appl. No. 12/571,192.
U.S. Office Action dated Dec. 2, 2011 in U.S. Appl. No. 12/571,239.
U.S. Office Action dated Jul. 19, 2012 in U.S. Appl. No. 12/571,239.
U.S. Office Action dated Nov. 21, 2012 in U.S. Appl. No. 12/571,239.
U.S. Office Action dated May 24, 2013 in U.S. Appl. No. 12/571,239.
U.S. Office Action dated Sep. 11, 2013 in U.S. Appl. No. 12/571,239.
U.S. Appl. No. 12/571,053 Office Action mailed Apr. 4, 2014.
U.S. Appl. No. 12/571,053 Office Action mailed Jun. 9, 2014.
U.S. Appl. No. 12/571,239 Office Action mailed Apr. 9, 2014.
U.S. Appl. No. 12/571,239 Office Action mailed Jun. 6, 2014.

* cited by examiner

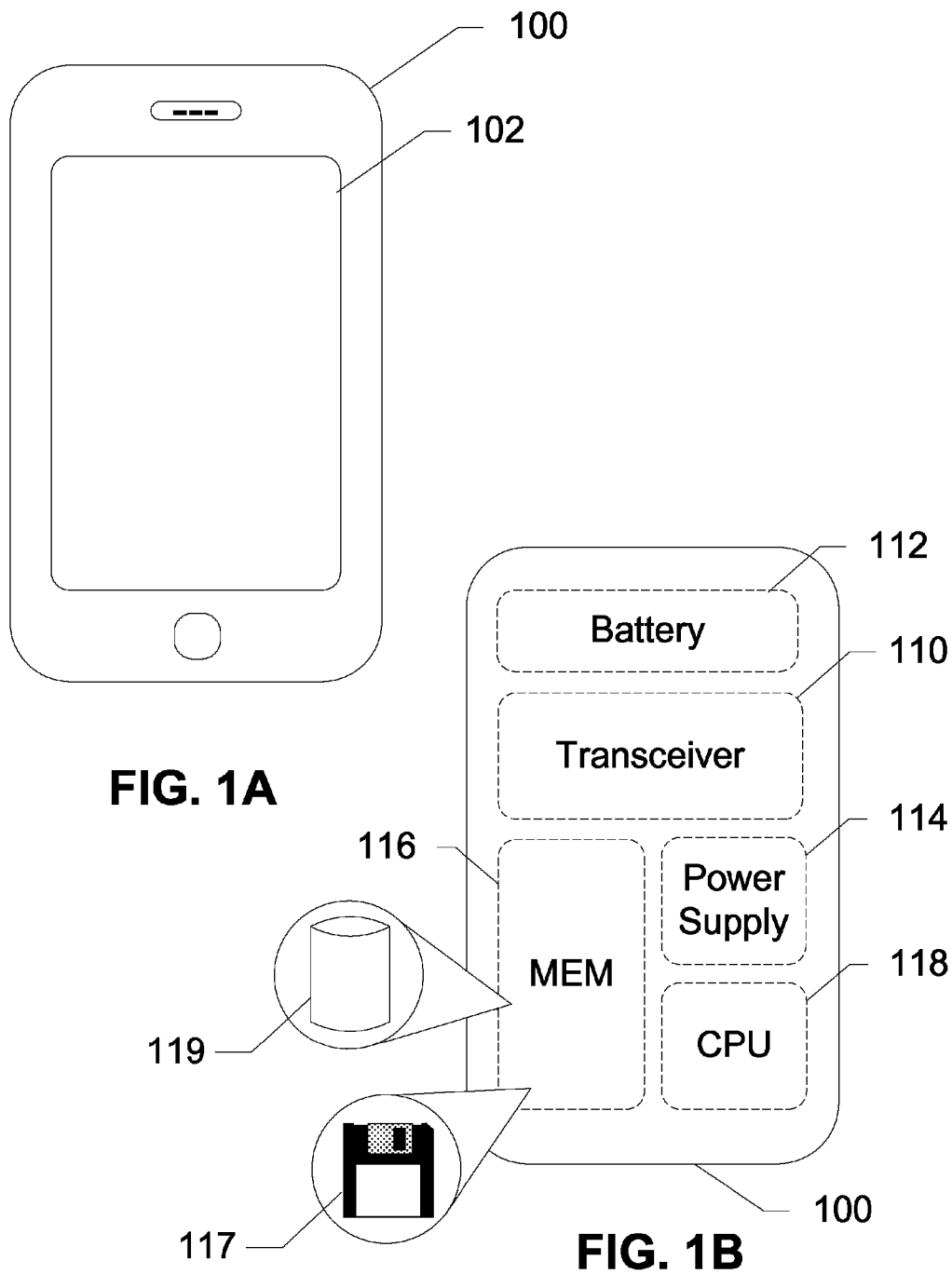

PREDICTIVE SENSITIZED KEYPAD

BACKGROUND OF THE INVENTION

1. Field of the Invention

The present invention relates to text-entry devices. More specifically, the present invention relates to dynamically generating a keyboard on a text-entry device.

2. Background of the Invention

Texting and messaging have become increasingly popular among wireless users. Texting gives users a quick and easy way to send a note to someone else without necessarily interrupting. Cellular providers have created a category of Quick Messaging Devices that are consumer based, messaging centric phones that utilize a virtual or physical full QWERTY keyboard to make typing easier. Within the span of less than a year, this segment has grown at a double digit rate.

The current text input methods on mobile devices are quite cumbersome. The hard keyboards, such as those in BLACK-BERRY devices, require triple tap to input one character. This problem has been overcome to an extent with soft keyboards on IPHONES, but yet soft keyboards require a careful positioning of the finger on the character to prevent mistyping. This is particularly problematic for the elderly and visually handicapped users. These and many other users have the problem of striking multiple keys at once, often due to the relatively small size of the individual keys.

Many mobile devices offer modes of predictive text to help customers enter the words that they intend to type. However most of these are based on correcting a word after it has been mistyped or allowing the customer to choose from a likely list of possibilities as they are typing. Both methods address the problem during or after the process of mistyping a word.

What is needed is a way of avoiding mistyping before it ever occurs in order to prevent errors and give a user a better experience. Such a device or method should also be able to be used with current predictive text models.

SUMMARY OF THE INVENTION

The present invention includes systems and methods for improving the efficiency of text input by generating a dynamic virtual keyboard. Exemplary embodiments of the present invention display a soft keyboard on a touchscreen of a text-entry device. The touchscreen works with the soft keyboard as a form of text input. Keyboard logic on the text-entry device is programmed to change the sensitivity of the footprint of keys surrounding a predicted key or keys, based upon the prior entry. The keyboard logic assigns a prediction value to each key based on a statistical probability that the key will be entered next. The touchscreen displays a dynamic virtual keyboard based on these prediction values. Enhancements include reducing the sensitivity of the footprint of keys relative to their prediction value. For instance, if a key is very unlikely to be the next intended key pressed, the footprint of the key will only respond to a key press of greater force than a key which is likely to be entered next.

In one exemplary embodiment, the present invention is a text-entry device for generating a dynamic virtual keyboard. The text-entry device includes a processor, a memory in communication with the processor, a touchscreen in communication with the processor, and a keyboard logic stored on the memory. The keyboard logic displays a dynamic keyboard having a plurality of visible keys and respective footprints responding to substantially the same force on the touchscreen, assigns a prediction value to each key after a user enters a key, and adjusts the sensitivity of at least one footprint relative to the assigned prediction value.

In another exemplary embodiment, the present invention is a method of enhancing a dynamic virtual keyboard. The method includes displaying a dynamic keyboard having a plurality of visible keys and respective footprints responding to substantially the same force on the touchscreen, assigning a prediction value to each key after each key entry, and adjusting the sensitivity of at least one footprint relative to the assigned prediction value. The dynamic keyboard is displayed on the touchscreen of a text-entry device.

In a further exemplary embodiment, the present invention is a computer program stored on a computer readable medium for enhancing a dynamic keyboard. The computer program includes a first code segment for displaying a dynamic keyboard having a plurality of visible keys and respective footprints responding to substantially the same force on the touchscreen, a second code segment for assigning a prediction value to each key after each key entered, and a third code segment for adjusting the sensitivity of at least one footprint relative to the assigned prediction value. The dynamic keyboard is displayed on the touchscreen of a text-entry device.

BRIEF DESCRIPTION OF THE DRAWINGS

FIGS. 1A and 1B show a text-entry device for generating a dynamic virtual keyboard, according to an exemplary embodiment of the present invention.

DETAILED DESCRIPTION OF THE INVENTION

Figure 2A:
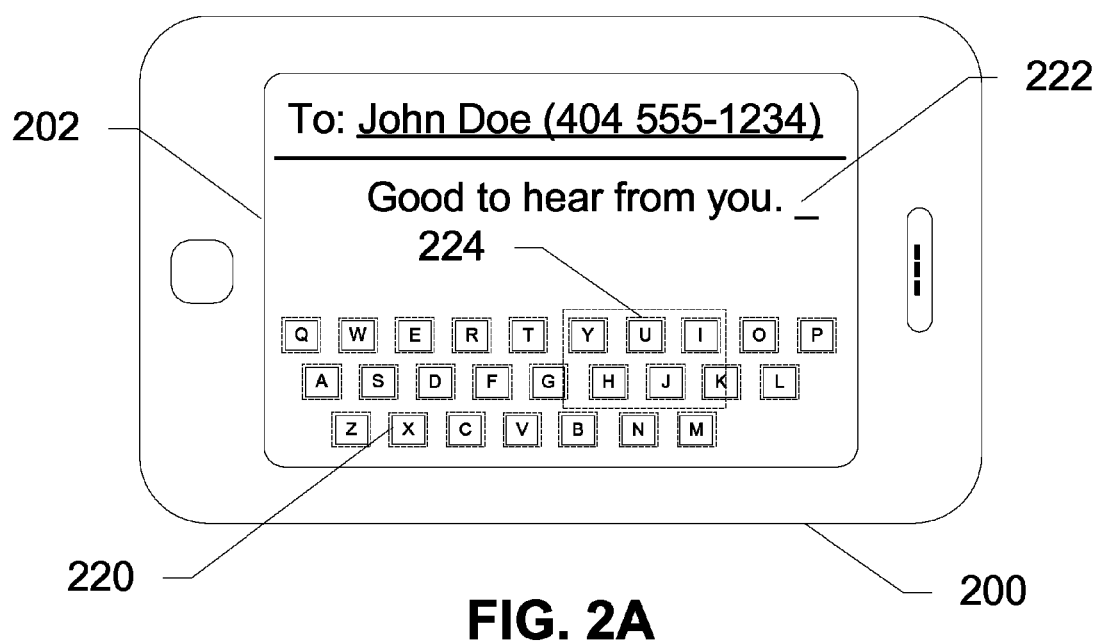
FIG. 2A shows a virtual keyboard on a touchscreen of a text-entry device where a user is beginning a new sentence, according to an exemplary embodiment of the present invention.

The present invention is a system and method for improving the efficiency of text input by generating a dynamic virtual keyboard. Exemplary embodiments of the present invention display a soft keyboard on a touchscreen of a text-entry device. The touchscreen works with the soft keyboard as a form of text input. Keyboard logic on the text-entry device is programmed to change the sensitivity of the footprint of keys surrounding a predicted key or keys, based upon the prior entry. The keyboard logic assigns a prediction value to each key based on a statistical probability that the key will be entered next. The touchscreen displays a dynamic virtual keyboard based on these prediction values. Enhancements include reducing the sensitivity of the footprint of keys relative to their prediction value. For instance, if a key is very unlikely to be the next intended key pressed, the footprint of the key will only respond to a key press of greater force than a key which is likely to be entered next. Other exemplary embodiments exploit the possible character sequences and their probabilities in a language and restructuring the keyboard to make text input more efficient. The invention can be used in conjunction with current predictive text models.

Virtual keyboards are comprised of a visible key, which is the visible portion that the user actually sees, and the actual touch footprint, which is the area of the touchpad that the user can make contact with to register a key entry. While a user does not see a footprint, the footprint must be touched in order for the touchscreen to register the associated key entry. In many cases the footprint will be the exact size and shape of the visible key, but this is not necessary. The present invention uses virtual keyboards such that the text-entry device actually affects the sensitive area of the keys based on the predictive text to avoid accidental mistypes. For instance, if the customer is typing 'Questi_', and the device knows that 'Question' is the predictive word, then it will decrease the sensitivity of the footprints of the keys surrounding the keys to be typed in comparison to the sensitivity before any keys are typed. The invention may utilize a method by which it desensitizes the touch resistance on a virtual touch interface or reduce/increase the capacitive resistance on such touch devices in relation to keys surrounding the intended key. This design helps facilitate the advantages of predictive text (a.k.a. T9) but combines with the initial input of text before it occurs, thereby reducing the number of mistaken keystrokes by the user before they occur. This implementation is not limited to text but could be implemented for numeric and other forms of input where a virtual keypad is used. For instance, a user dialing a common telephone number could have a virtual 10 digit dialing keypad that desensitizes certain keys as the user types. A tablet with a medical questionnaire might desensitize input options based on questions answered in the past.

For example, most soft keyboards known in the art have small keys that are roughly the same size. With many of these devices, multiple keys may be hit at the same time due to their small size and the lack of space between keys or footprints of keys. When the user is an elderly person or visually handicapped person using one of these keyboards, the user may have a hard time pressing the correct key and only the correct key. These groups often accidentally press multiple keys at once as their dexterity and/or vision is decreased. However, they may still desire a small device. The present invention helps to alleviate these issues faced by the groups. As the present invention decreases the sensitivity of the footprint of keys around the likely keystrokes, the invention makes the intended keys easier to hit. Thus, the user, even with limited sight or dexterity, is able to easily type a message without having to constantly correct accidental keystrokes.

Given a corpus of a language (say English), exemplary embodiments of the invention break down the words into a sequence of characters. Using these sequences of characters, the probability of a particular letter following a character is calculated. Using the above example, the probability of 'U' following 'Q' is very high in the English language since 'Q' is almost always followed by 'U'. This notion can be extended to larger contexts as well, such as the probability of an 'E' entered after the three characters 'S', 'T', and 'E'. These probabilities can be used to modify many facets of the soft keyboard.

"Text-entry device," as used herein and throughout this disclosure, refers to an electronic device which accepts an alphanumeric input often supplied by a virtual or physical keyboard. Examples of a text-entry device include notebook computers, tablet computers, personal digital assistants (PDAs), cellular telephones, smart phones, etc.

"Touchscreen," as used herein and throughout this disclosure, refers to a display that can detect and locate a touch on its surface. Examples of types of touchscreen include resistive, which can detect many objects; capacitive, which can detect multiple touches at once; etc.

"Logic," as used herein and throughout this disclosure, refers to any information having the form of instruction signals and/or data that may be applied to affect the operation of a processor. Examples of processors are computer processors (processing units), microprocessors, digital signal processors, controllers and microcontrollers, etc. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS (electrically erasable programmable read-only memories). Logic may also be comprised by digital and/or analog hardware circuits, for example, hardware circuits comprising logical AND, OR, XOR, NAND, NOR, and other logical operations. Logic may be formed from combinations of software and hardware.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIGS. 1A and 1B show a text-entry device 100 for generating a dynamic virtual keyboard, according to an exemplary embodiment of the present invention. In this embodiment, text-entry device 100 includes a touchscreen 102, a transceiver 110, a battery 112, a power supply 114, a central processing unit (CPU) 118, and a memory 116. Touchscreen 102 is an LCD or LED screen that is touch-sensitive such that a user can make selections on touchscreen 102. This allows the user to type letters, numbers, and symbols in order to create text messages, e-mails, etc. Touchscreen 102 displays a virtual keyboard according to commands sent from CPU 118. Transceiver 110 allows text-entry device 100 to wirelessly communicate with a network, other wireless devices, etc. Battery 112 stores a charge to power components of text-entry device 100. Power supply 114 provides power to each of the components of text-entry device 100. CPU 118 commands components of text-entry device 100 according to logic on memory 116. Memory 116 stores logic, data, etc. Among the logic stored on memory 116 is keyboard logic 117. Keyboard logic 117 displays a virtual keyboard, assigns a prediction value to each key after each key entry, and desensitizes the footprint of keys surrounding keys with higher prediction values until the next key is entered, at which time footprints of keys around the next predicted keys are desensitized. Keyboard logic 117 references language database 119 when assigning prediction values. Language database 119 contains, among other things, a dictionary, statistical data, etc. For instance, when the user is typing an e-mail, keyboard logic 117 predicts the next key entry that is necessary to complete a word being typed. Keyboard logic 117 instructs CPU 118 to command touchscreen 102 to display the virtual keyboard. The footprints of keys surrounding the predicted next key entry have a decreased sensitivity, such that it is harder for the user to accidentally press these keys.

There are many other embodiments of a text-entry device that uses a dynamic virtual keyboard. The embodiment in FIGS. 1A and 1B is similar to that of a cellular telephone or smart phone. Another exemplary embodiment is a PDA having a dynamic virtual keyboard. The feel is similar to that of FIGS. 1A and 1B since the size of the touchscreen is comparable. Most users will find typing easiest using their thumbs. However, other embodiments accommodate users for finger typing. Another exemplary embodiment features a tablet computer with a dynamic virtual keyboard. A tablet computer typically has a much larger touchscreen than your average PDA and can accommodate a full size soft keyboard. The keyboard logic can make this typing experience just as easy by generating a dynamic virtual keyboard. Also, a soft numeric keypad such as that generated on the touchscreen of a cellular telephone utilizes a dynamic virtual keypad. When typing text, the keyboard logic desensitizes the numeric keys surrounding a predicted key based on the prediction values of the associated characters similar to that of a QWERTY keyboard. When dialing telephone numbers, the keyboard logic references a contacts list on the cellular telephone and calculates prediction values based on statistical patterns from the contacts list.

Figure 2B:
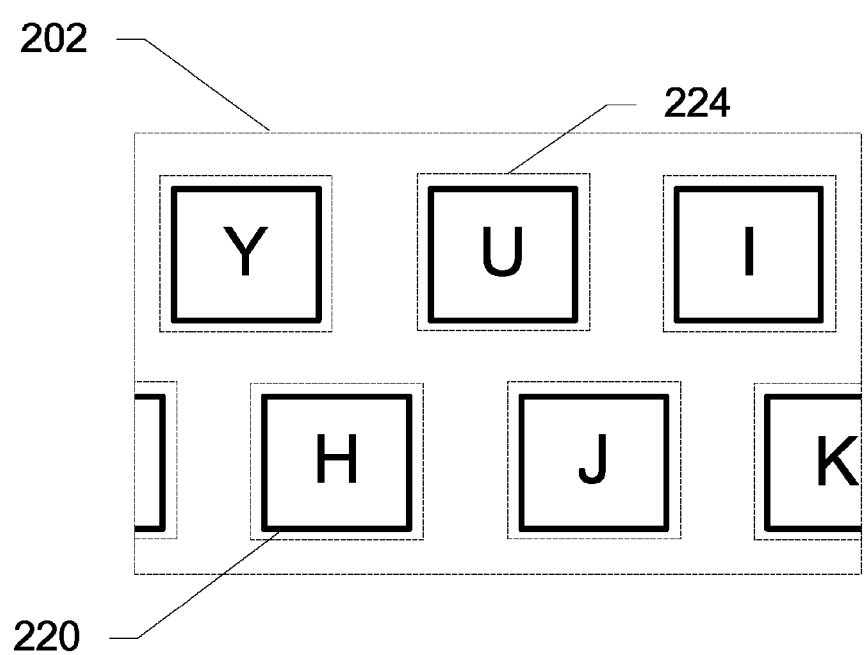
FIG. 2B shows a key and footprint of a virtual keyboard on a touchscreen of a text-entry device, according to an exemplary embodiment of the present invention.

FIGS. 2A and 2B show changes to a virtual keyboard at different points in a word or sentence, according to exemplary embodiments of the present invention. These figures show examples of how the footprints of keys surrounding predicted keys on the keyboard are desensitized due to their non-likelihood of being the next key entry.

FIG. 2A shows a virtual keyboard 220 on a touchscreen 202 of a text-entry device 200 where a user is beginning a new sentence, according to an exemplary embodiment of the present invention. In this embodiment, the user has just completed a sentence, as signified by a period at the end of the sentence, and the user is about to begin a new sentence at entry space 222. At this point, each of the keys corresponding to letters or numbers has the same footprint sensitivity. For instance, a footprint around every other key in keyboard 220 and a footprint 224 around the 'U' key have the same sensitivity at this point.

Each key has a footprint around the key. While the visible key may be a certain size, the footprint may be larger or smaller than the visible key. The sensitivity of each footprint may remain at a normal level or decreased in order to make the key harder to press accidentally. This is especially useful for key footprints around a predicted key, as making surrounding keys less sensitive makes hitting the correct key easier.

FIG. 2B shows a key and footprint of a virtual keyboard on a touchscreen 202 of a text-entry device 200, according to an exemplary embodiment of the present invention. In this embodiment, a 'U' key is surrounded by a footprint 224 of the key. The key is the letter, number, or symbol on the virtual keyboard that is visible to the user. Footprint 224 is the space on touchscreen 202 corresponding to a letter, number, or symbol which, when pressed, causes the corresponding letter, number, or symbol to be entered. Footprint 224 may be larger or smaller than the corresponding key, making the selecting of that letter, number, or symbol easier or harder. Footprint 224 may be a normal sensitivity or may be desensitized to make selecting the 'U' key more difficult. In the embodiment shown, the user is beginning a sentence and the footprint of each of the keys is the same sensitivity. This means that each of the keys requires the same amount of precision and pressure to select as any other.

Figure 3A:
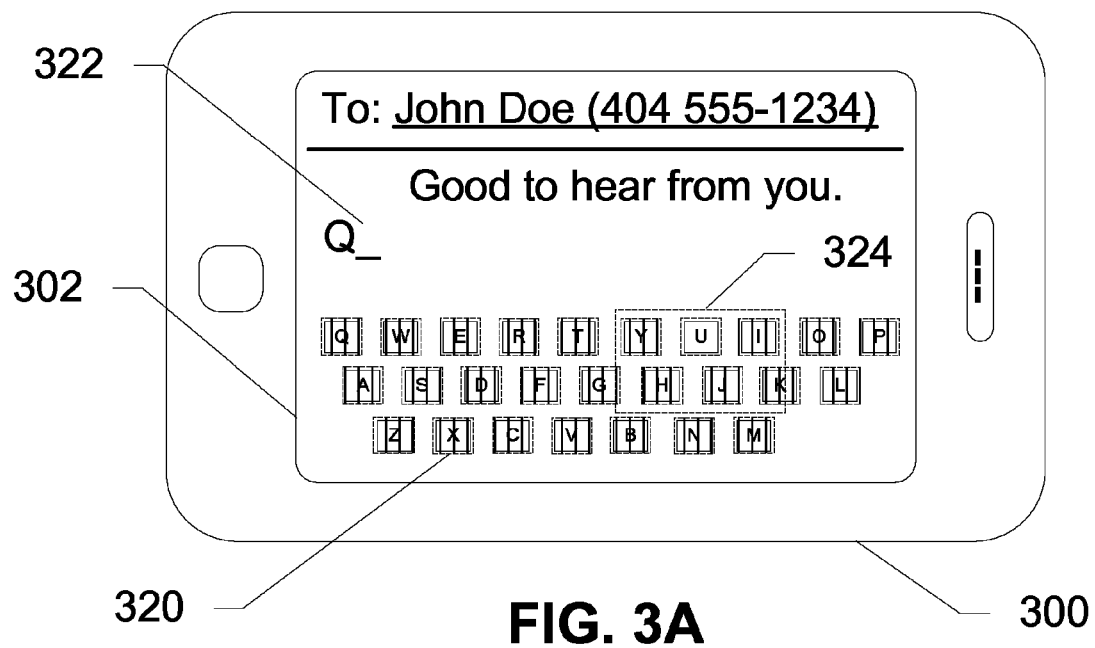
FIG. 3A shows a virtual keyboard on a touchscreen of a text-entry device where a user has entered a 'Q' as the first letter of a word, according to an exemplary embodiment of the present invention.

FIG. 3A shows a virtual keyboard 320 on a touchscreen 302 of a text-entry device 300 where a user has entered a 'Q' as the first letter of a word, according to an exemplary embodiment of the present invention. The next letter of the word is to be entered at entry space 322. In this embodiment, the sensitivity of the footprints of keys surrounding the predicted keys is decreased in order to make accidentally pressing those keys more difficult. For instance, in the figure, because 'Q' has been entered as the first letter of the word, the probability of the next letter being 'U' is very high. Thus, a footprint 324 around the 'U' key remains the normal sensitivity. Keys surrounding the 'U' key are all desensitized based upon their low probability of being the next key selected.

Figure 3B:
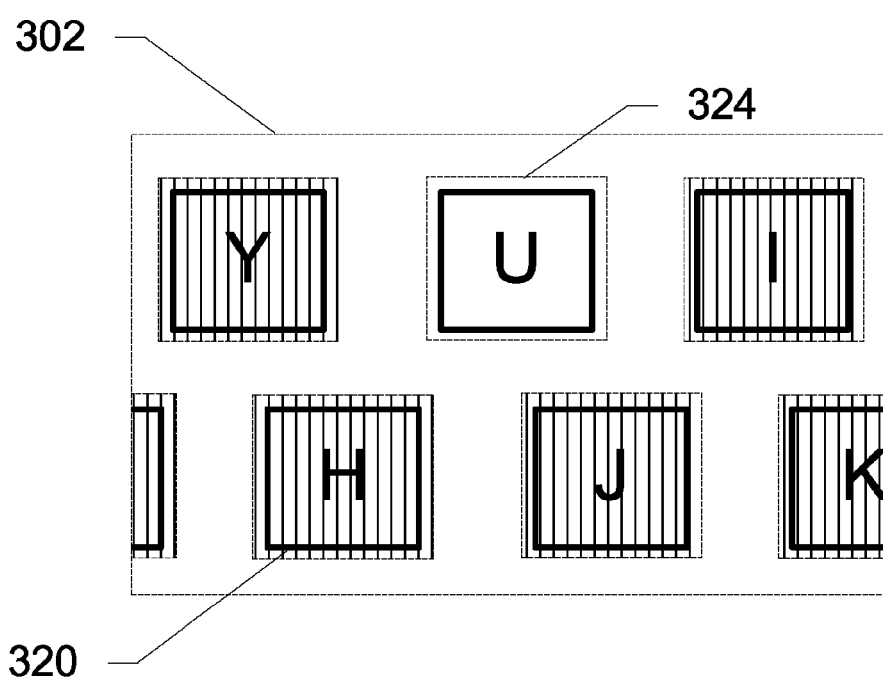
FIG. 3B shows a key and footprint of a virtual keyboard on a touchscreen of a text-entry device, according to an exemplary embodiment of the present invention.

FIG. 3B shows a key and footprint 324 of a virtual keyboard 320 on a touchscreen 302 of text-entry device 300, according to an exemplary embodiment of the present invention. In this embodiment, a 'U' key is surrounded by a footprint 324 of the key. As the first letter of an entered word was 'Q' and the most likely next letter is 'U', footprint 324 surrounding 'U' key remains the same sensitivity while the surrounding footprints are desensitized. Desensitizing footprints of keys surrounding the 'U' key makes striking the 'U' key much easier. The user is not forced to be as precise as when all keys on the virtual keyboard 320 are the same sensitivity. This allows the user to be more efficient, as fewer mistakes are generally made.

Figure 4A:
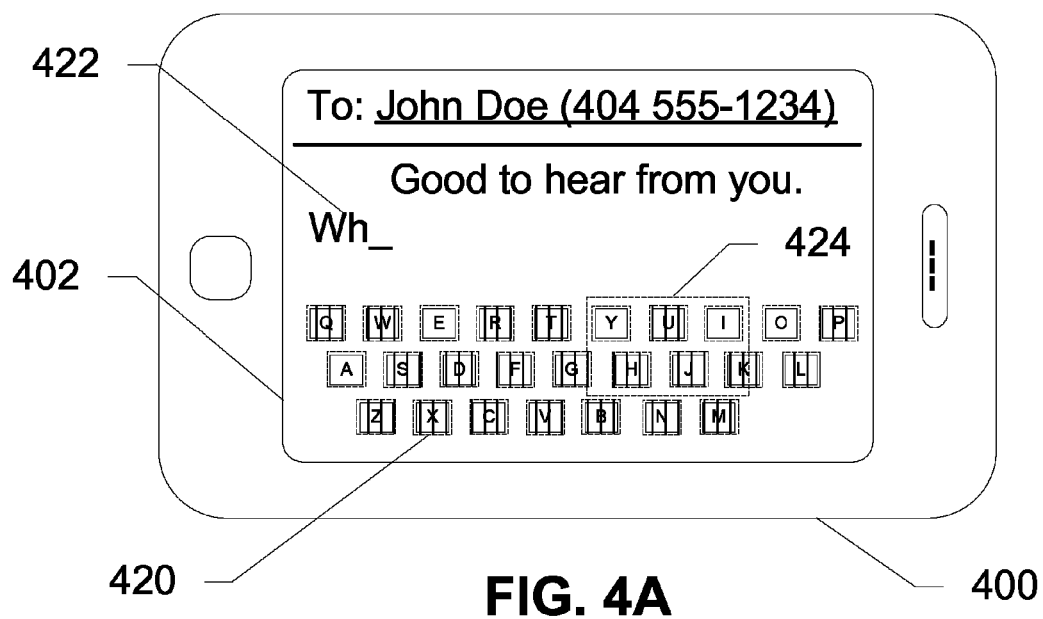
FIG. 4A shows a virtual keyboard on a touchscreen of a text-entry device where a user has entered a 'WH' as the beginning of a word, according to an exemplary embodiment of the present invention.

FIG. 4A shows a virtual keyboard 420 on a touchscreen 402 of a text-entry device 400 where a user has entered a 'WH' as the beginning of a word, according to an exemplary embodiment of the present invention. The next letter of the word is to be entered at entry space 422. In this embodiment, the sensitivity of the footprints of keys surrounding the predicted keys is decreased in order to make accidentally pressing those keys more difficult. For instance, in the figure, because 'WH' has been entered as the beginning of the word, the probability of the next letter being 'Y' or 'I' is very high, while the probability of the next letter being 'U' is not as high. Thus, a footprint 424 around the 'U' key is desensitized. Keys surrounding the 'Y' and 'I' key are all desensitized based upon their low probability of being the next key selected.

Figure 4B:
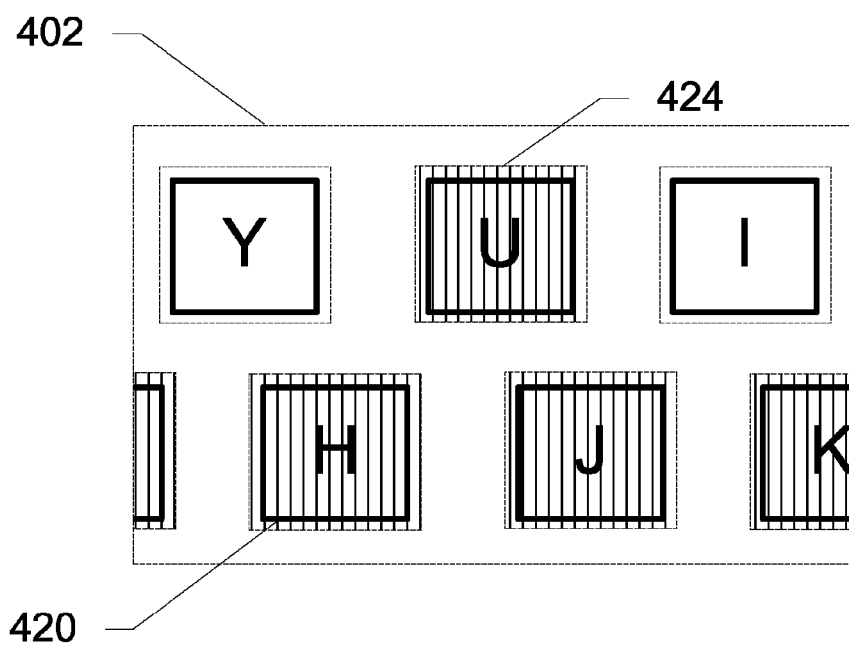
FIG. 4B shows a key and footprint of a virtual keyboard on a touchscreen of a text-entry device, according to an exemplary embodiment of the present invention.

FIG. 4B shows a key and footprint 424 of a virtual keyboard 420 on a touchscreen 402 of text-entry device 400, according to an exemplary embodiment of the present invention. In this embodiment, a 'U' key is surrounded by a footprint 424 of the key. As the beginning of an entered word was 'WH' and the 'U' key is not likely to be the next key struck, footprint 424 surrounding 'U' key is desensitized as well as other footprints of keys surrounding the more probable footprints of keys 'Y' and 'I'. Desensitizing footprints of keys surrounding the 'Y' and 'I' keys makes striking these keys much easier. The user is not forced to be as precise as when all keys on the virtual keyboard 420 are the same sensitivity. This allows the user to be more efficient, as fewer mistakes are generally made.

Figure 5A:
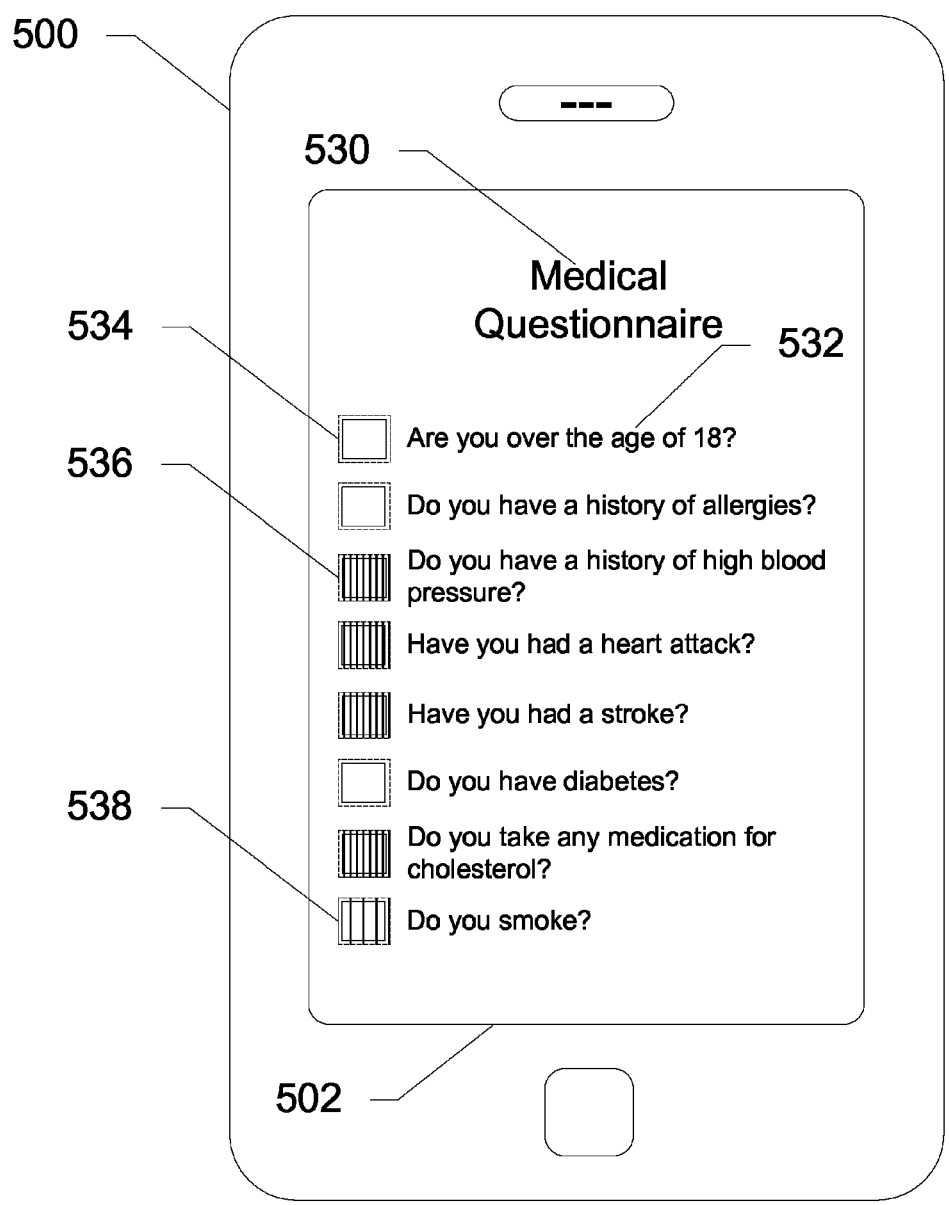
FIG. 5A shows a dynamic medical questionnaire on a touchscreen of a device, according to an exemplary embodiment of the present invention.
Figure 5B:
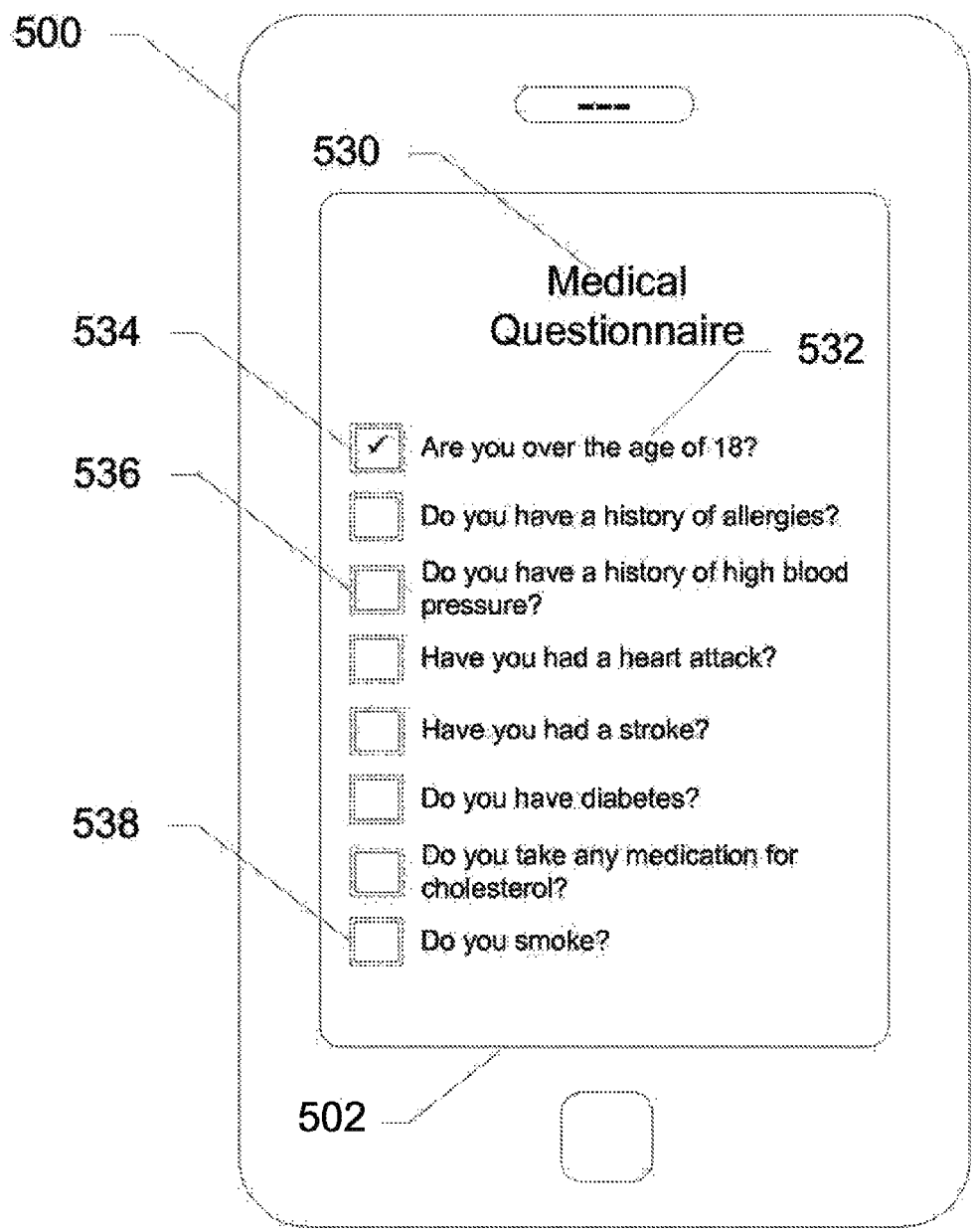
FIG. 5B shows a dynamic medical questionnaire on a touchscreen of a device, according to an exemplary embodiment of the present invention.

FIGS. 5A and 5B show a dynamic medical questionnaire for improving the efficiency of input, according to an exemplary embodiment of the present invention. Such a questionnaire desensitizes certain parts of the screen of the entry device according to other inputs. In such a medical questionnaire, the selection areas for medical problems not usually associated with a group selected become desensitized such that they are not accidentally selected.

FIG. 5A shows a dynamic medical questionnaire 530 on a touchscreen 502 of a device 500, according to an exemplary embodiment of the present invention. In this embodiment, dynamic medical questionnaire 530 improves the efficiency of inputs by a user. As shown, the user has not answered a question 532 by selecting box 534 which states that the user is over the age of 18. Because the user has not stated that the user is over the age of 18, certain medical problems are very unlikely. For instance, the user under the age of 18 may have a history of allergies or have diabetes, but is very unlikely to have high blood pressure, have had a heart attack or stroke, take medication for cholesterol, or smoke regularly. Because the probability of having a history of high blood pressure is very low, box 536 for corresponding to this history is desensitized when the user has not selected box 534 stating the user is over 18. Because it is possible that the user smokes under age 18, but not probable, box 538 is slightly desensitized. The desensitized keys are less likely to be accidentally pressed when the user is answering medical questionnaire 530.

FIG. 5B shows a dynamic medical questionnaire 530 on a touchscreen 502 of a device 500, according to an exemplary embodiment of the present invention. In this embodiment, dynamic medical questionnaire 530 improves the efficiency of inputs by a user. As shown, the user has answered question 532 by selecting box 534 which states that the user is over the age of 18. Because the user is over the age of 18, certain medical problems become more likely. For instance, the user over the age of 18 may have a history of allergies, have diabetes, have high blood pressure, have had a heart attack or stroke, take medication for cholesterol, or smoke regularly. Because the probability of having a history of high blood pressure is much higher for a patient over the age of 18 than one under the age of 18, box 536 corresponding to this history is now the normal sensitivity when the user has selected box 534 stating the user is over 18. Because it is more probable that the user over the age of 18 smokes than the user under the age of 18, box 538 is now the normal sensitivity.

Figure 6:
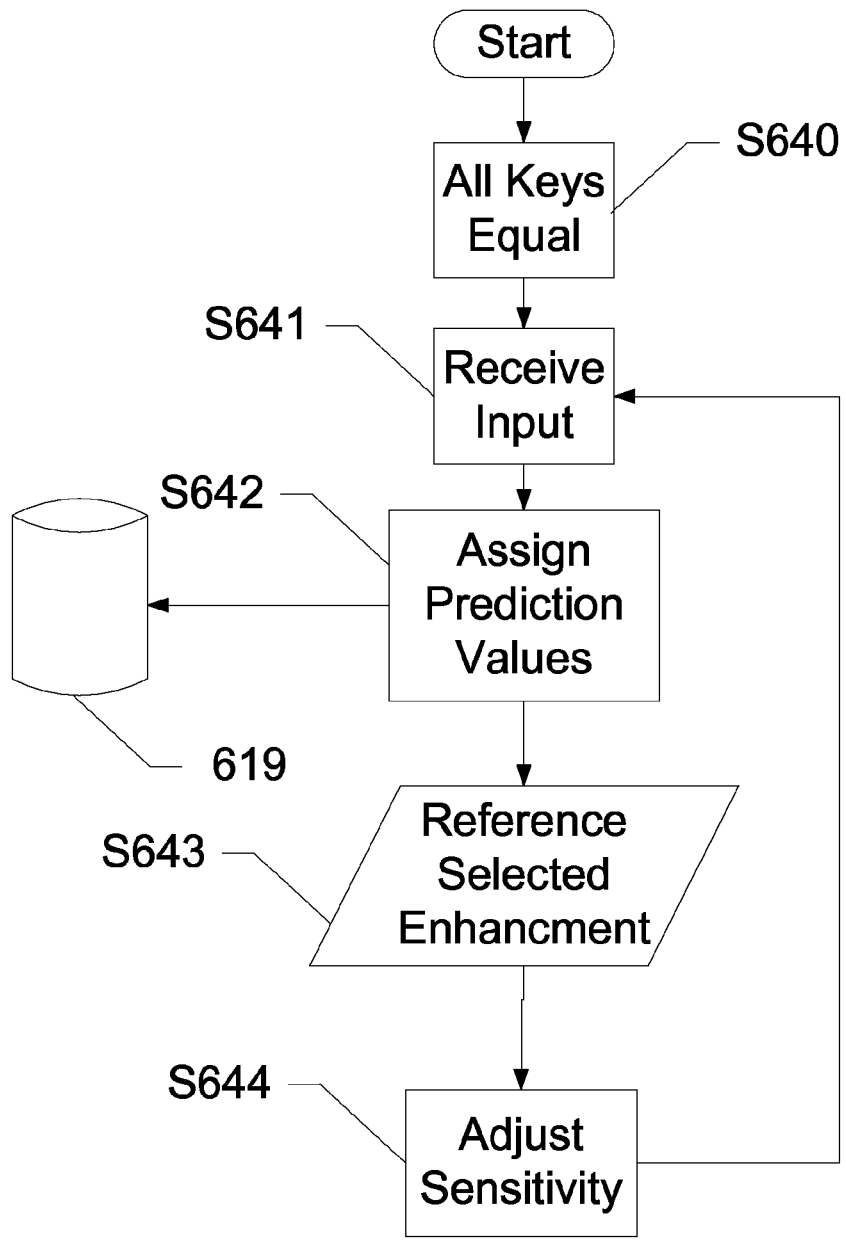
FIG. 6 shows a flowchart of a method of dynamically enhancing a virtual keyboard of a text-entry device, according to an exemplary embodiment of the present invention.

FIG. 6 shows a flowchart of a method of dynamically enhancing a virtual keyboard of a text-entry device, according to an exemplary embodiment of the present invention. In this embodiment, when the user begins entering text into an e-mail, text message, or other writing, all of the keys of the dynamic keypad are the same sensitivity S640. The dynamic keyboard receives an input S641 from, for example, a key entry. With an input received, keyboard logic on the text-entry device assigns prediction values to each of the keys on the keyboard S642. This is accomplished by referencing language database 619. This prediction value is the chance that a given character with a corresponding key is the character that will be entered by the user to complete a word or sentence. With the prediction values assigned, the keyboard logic references a selected enhancement to the keyboard S643. The database informs the keyboard logic which keys should be desensitized, and how much, based upon the prediction values. The keyboard logic then instructs a processor to command a touchscreen to adjust the sensitivity of footprints of keys surrounding predicted keys S644.

The adjustment of the touchscreen sensitivity depends on the type of touchscreen used in the text-entry device. Operating systems running resistive touchscreens attach an integer representing a direct relationship to the sensitivity. Thus, a zero (0) would signify a completely non-sensitive area while larger numbers signify more sensitive areas. The average touchscreen is manufactured such that it responds to an average force of about 190 grams. The average touchscreen can determine forces ranging from 0 to 500 grams. When the touchscreen is desensitized by the keyboard logic, keys with low prediction values will only respond to a force of 300 grams, for instance, while keys with high prediction values will respond to the normal 190 grams of force. Other types of touchscreens use different means to determine sensitivity. A capacitive-type touch screen does not measure the amount of force, but uses a galvanic response of the skin to induce a current through the touch screen. The amount of current induced is somewhat related to the force of the press, but not directly. Therefore, the sensitivity change is measured by the current induced into the touchscreen rather than the force measured by the touchscreen. Other types of touchscreens may have different ways of adjusting the sensitivity. However, those having skill in the art will readily recognize incorporation of those adjustments into the present invention.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device comprising:
    a processor; and
    a memory storing a keyboard logic that, when executed by the processor, causes the processor to perform operations comprising:
        displaying a questionnaire having a first visible key and a second visible key, the first visible key associated with a first footprint and the second visible key associated with a second footprint, the first footprint associated with a first sensitivity and the second footprint associated with a second sensitivity, wherein the first sensitivity and the second sensitivity are substantially similar prior to receiving a selection of the first visible key, the first visible key associated with a first question and the second visible key associated with a second question,
        receiving the selection of the first visible key, wherein the selection of the first visible key affirms the first question,
        assigning, in response to receiving the selection of the first visible key, a prediction value to the second visible key based on a probability that the second question associated with the second visible key will be affirmed via selection of the second visible key after selection of the first visible key affirming the first question associated with the first visible key, and desensitizing the second sensitivity of the second footprint associated with the second visible key based on the prediction value, wherein desensitizing the second sensitivity of the second footprint associated with the second visible key comprises altering a force required to select the second visible key.

2. The device of claim 1, further comprising a transceiver.

3. The device of claim 2, wherein the transceiver uses cellular RF or WiFi.

4. The device of claim 1, wherein the first question is associated with an age of a user and the second question is associated with a medical condition, and wherein desensitizing the second sensitivity of the second footprint associated with the second visible key indicates that the probability that the user has the medical condition, based on affirmation of the first question associated with the age of the user, is low.

5. A method comprising:
displaying, by a device comprising a processor, a questionnaire having a first visible key and a second visible key, the first visible key associated with a first footprint and the second visible key associated with a second footprint, the first footprint associated with a first sensitivity and the second footprint associated with a second sensitivity, wherein the first sensitivity and the second sensitivity are substantially similar prior to receiving a selection of the first visible key, the first visible key associated with a first question and the second visible key associated with a second question;

receiving, by the device, the selection of the first visible key, wherein the selection of the first visible key affirms the first question;

assigning, by the device in response to receiving the selection of the first visible key, a prediction value to the second visible key based on a probability that the second question associated with the second visible key will be affirmed via selection of the second visible key after selection of the first visible key affirming the first question associated with the first visible key; and desensitizing, by the device, the second sensitivity of the second footprint associated with the second visible key based on the prediction value, wherein desensitizing the second sensitivity of the second footprint associated with the second visible key comprises altering a force required to select the second visible key.

6. The method of claim 5, further comprising resetting the second sensitivity of the second footprint associated with the second visible key to be substantially similar to the first sensitivity of the first footprint associated with the first visible key.

7. The method of claim 5, wherein the first question is associated with an age of a user and the second question is associated with a medical condition, and wherein desensitizing the second sensitivity of the second footprint associated with the second visible key indicates that the probability that the user has the medical condition, based on affirmation of the first question associated with the age of the user, is low.

8. A non-transitory computer readable medium storing instructions that when executed by a processor, cause the processor to perform operations comprising:
displaying a questionnaire having a first visible key and a second visible key, the first visible key associated with a first footprint and the second visible key associated with a second footprint, the first footprint associated with a first sensitivity and the second footprint associated with a second sensitivity, wherein the first sensitivity and the second sensitivity are substantially similar prior to receiving a selection of the first visible key, the first visible key associated with a first question and the second visible key associated with a second question;

receiving the selection of the first visible key, wherein the selection of the first visible key affirms the first question;

assigning, in response to receiving the selection of the first visible key, a prediction value to the second visible key based on a probability that the second question associated with the second visible key will be affirmed via selection of the second visible key after selection of the first visible key affirming the first question associated with the first visible key; and desensitizing the second sensitivity of the second footprint associated with the second visible key based on the prediction value, wherein desensitizing the second sensitivity of the second footprint associated with the second visible key comprises altering a force required to select the second visible key.

9. The non-transitory computer readable medium of claim 8, wherein the operations further comprise resetting the second sensitivity of the second footprint associated with the second visible key to be substantially similar to the first sensitivity of the first footprint associated with the second visible key.

10. The non-transitory computer readable medium of claim 8, wherein the first question is associated with an age of a user and the second question is associated with a medical condition, and wherein desensitizing the second sensitivity of the second footprint associated with the second visible key indicates that the probability that the user has the medical condition, based on affirmation of the first question associated with the age of the user, is low.

* * * * *